United States Patent
Suzuki et al.

(10) Patent No.: US 12,202,503 B2
(45) Date of Patent: Jan. 21, 2025

(54) DISPLAY SYSTEM, CAMERA MONITORING SYSTEM, AND DISPLAY METHOD

(71) Applicant: Panasonic Intellectual Property Management Co., Ltd., Osaka (JP)

(72) Inventors: Takayuki Suzuki, Kanagawa (JP); Tooru Kameyama, Kanagawa (JP); Akitoshi Yamashita, Hyogo (JP); Masafumi Takeshita, Kanagawa (JP); Yutaka Kanazawa, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 251 days.

(21) Appl. No.: 17/882,392

(22) Filed: Aug. 5, 2022

(65) Prior Publication Data
US 2022/0379908 A1  Dec. 1, 2022

Related U.S. Application Data

(63) Continuation of application No. PCT/JP2020/041949, filed on Nov. 10, 2020.

(30) Foreign Application Priority Data

Feb. 6, 2020 (JP) .................. 2020-019008

(51) Int. Cl.
*B60W 50/14* (2020.01)
*B60R 1/26* (2022.01)
(Continued)

(52) U.S. Cl.
CPC ............... *B60W 50/14* (2013.01); *B60R 1/26* (2022.01); *B60R 1/28* (2022.01); *B60W 50/085* (2013.01); *B60W 2050/146* (2013.01)

(58) Field of Classification Search
CPC ...................................................... B60W 50/14
See application file for complete search history.

(56) References Cited

U.S. PATENT DOCUMENTS 8,620,549 B2 * 12/2013 Nickolaou ............. B60Q 9/008
701/70
8,963,701 B2 * 2/2015 Rodriguez Barros . B60Q 1/324
340/468

(Continued)

FOREIGN PATENT DOCUMENTS

JP  2008-018798  1/2008
JP  2016-124393  7/2016

(Continued)

OTHER PUBLICATIONS

International Search Report issued in International Patent Application No. PCT/JP2020/041949, dated Dec. 28, 2020, along with an English translation thereof.

*Primary Examiner* — Michael A Berns
(74) *Attorney, Agent, or Firm* — Greenblum & Bernstein, P.L.C.

(57) ABSTRACT

A video acquisition unit acquires a video from an imaging unit provided in a vehicle to capture a scene around the vehicle. A display unit is provided in the vehicle to display the video captured by the imaging unit. A control unit switches, when it is predicted that a passenger of the vehicle will leave the vehicle, a mode of the display system to a mode in which visibility for the passenger is improved.

8 Claims, 14 Drawing Sheets

(51) Int. Cl.
   *B60R 1/28* (2022.01)
   *B60W 50/08* (2020.01)

(56) References Cited

U.S. PATENT DOCUMENTS

| | | | |
|---|---|---|---|
| 9,919,705 B2* | 3/2018 | Ihlenburg | B60W 30/09 |
| 10,183,640 B2* | 1/2019 | Rhode | E05C 17/006 |
| 10,525,886 B2* | 1/2020 | Imamura | B60R 1/26 |
| 10,657,818 B2* | 5/2020 | Dhull | B60N 2/002 |
| 10,688,921 B2* | 6/2020 | Berkowitz | F21V 15/01 |
| 11,366,311 B2* | 6/2022 | Imamura | G02B 5/3083 |
| 11,618,381 B2* | 4/2023 | Ham | G08G 1/167 |
| | | | 340/435 |
| 11,772,645 B2* | 10/2023 | Naserian | E05F 15/76 |
| | | | 340/435 |
| 2018/0345860 A1 | 12/2018 | Imamura et al. | |
| 2022/0135077 A1* | 5/2022 | Moon | B60W 60/0027 |
| | | | 701/26 |
| 2022/0185113 A1* | 6/2022 | Nix | B60K 35/10 |

FOREIGN PATENT DOCUMENTS

| | | | |
|---|---|---|---|
| JP | 6014817 B1 * | 10/2016 | B60R 1/04 |
| JP | 2017-165218 | 9/2017 | |
| JP | 2018-055075 | 4/2018 | |
| JP | 2019-047296 | 3/2019 | |
| JP | 2019-151314 | 9/2019 | |
| JP | 2019-192090 | 10/2019 | |

* cited by examiner

DISPLAY SYSTEM, CAMERA MONITORING SYSTEM, AND DISPLAY METHOD

BACKGROUND

1. Field

The present disclosure relates to a display system, a camera monitoring system, a display method, and a display program mounted on a vehicle.

2. Description of the Related Art

Accidents involving a passenger who opens the door on the assistant driver's seat of a vehicle to leave the vehicle from the assistant driver's seat and collides with a motorcycle or a bicycle approaching from behind occur frequently. Most of such collision accidents are said to be caused by failure of the passenger to check the safety. Contemporary vehicles are not provided with a mirror that allows a passenger other than the driver to check a space behind, and the passenger is required to check the safety visually when he or she leaves the vehicle. It is predicted that collision accidents mentioned above may increase in the future as rental bicycle becomes more popular particularly in urban areas.

Meanwhile, a camera monitoring system (CMS), in which cameras are provided in place of ordinary side mirrors and which causes a pair of left and right monitors provided in the vehicle interior to display a video showing a scene diagonally behind the vehicle captured by the cameras, has been in practical use (see, for example, patent literature 1). In an ordinary camera monitoring system, the angle of installation of the monitor housing and the field angle or the display range of a video displayed on the monitor are adjusted with reference to the viewpoint of the driver for easy viewing from the driver. Meanwhile, there is a need to use the camera monitoring system when a passenger leaves the vehicle as well.

[Patent Literature 1] JP2018-55075

SUMMARY

The present disclosure addresses the above-described issue, and a purpose thereof is to provide a technology for improving visibility provided by a camera monitoring system to a person leaving a vehicle.

A display system according to an embodiment of the present disclosure includes: a video acquisition unit that acquires a video from an imaging unit provided in a vehicle to capture a scene around the vehicle; a display unit provided in the vehicle to display the video captured by the imaging unit; and a control unit that switches, when it is predicted that a passenger of the vehicle will leave the vehicle, a mode of the display system to a mode in which visibility for the passenger is improved.

Optional combinations of the aforementioned constituting elements, and implementations of the disclosure in the form of methods, apparatuses, systems, and computer programs may also be practiced as additional modes of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

Figure 1:
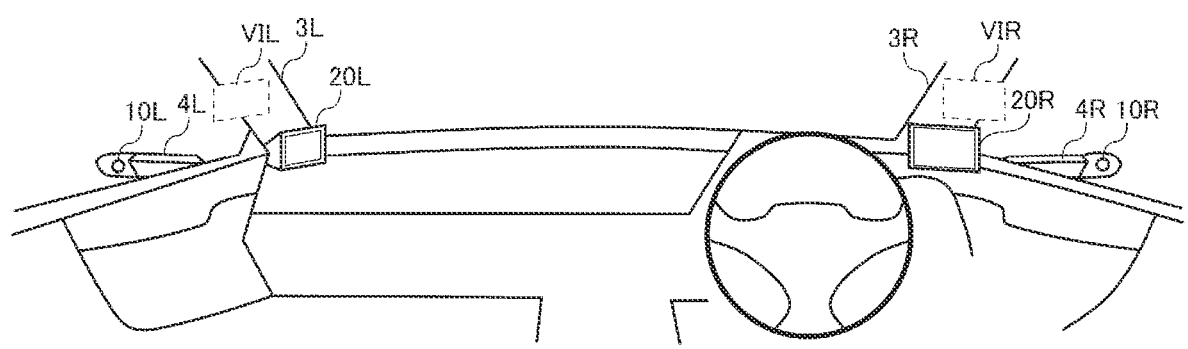
FIG. 1 shows a camera monitoring system according to the embodiment.

FIG. 1 shows a camera monitoring system according to the embodiment. The camera monitoring system shown in FIG. 1 is configured by replacing ordinary optical side mirrors by a camera monitoring system (electronic side mirror) including imaging units 10R, 10L and display systems 20R, 20L. For example, the imaging units 10R, 10L are visible light cameras. In the example shown in FIG. 1, the imaging units 10R, 10L are provided at the positions of ordinary optical side mirrors (door mirrors). The shape of mounting members 4R, 4L for fixing the imaging units 10R, 10L outside the vehicle are by way of example only, and mounting members of an arbitrary shape can be used. For example, the imaging units 10R, 10L may be fixed at positions closer to the vehicle body. In that case, the reduced size of the mounting members 4R, 4L reduces air resistance and improves fuel cost of the vehicle.

The imaging unit 10R on the right side captures an image of a scene to the rear right of the vehicle and transmits the captured video to the display system 20R on the right side. The imaging unit 10L on the left side captures an image of a scene to the rear left of the vehicle and transmits the captured video to the display system 20L on the left side. In the example shown in FIG. 1, the display system 20R on the right side is provided at the root of an A pillar 3R on the right side in the vehicle interior, and the display system 20L on the left side is provided at the root of an A pillar 3L on the left side.

In the case of an optical side mirror, the driver's gaze is focused on an actual object located diagonally behind. In the case of an ordinary camera monitoring system, on the other hand, the driver's gaze is focused on the screen of the display systems 20R, 20L. When the driver changes the gaze from a scene in front of the vehicle to the display system 20R on the right side or the display system 20L on the left side, therefore, the focal length of the driver's eyes changes significantly.

Generally, a driver drives a vehicle looking several tens of meters ahead. In the example shown in FIG. 1, the distance between the driver's viewpoint and the display system 20R on the right side is about 50 cm-60 cm. A frequently repeated large change in the focal length provides a feeling of weariness to the driver's eyes. Further, in the case of drivers having low focusing ability (e.g., elderly people), it takes time to focus on a new object after changing the gaze. FIG. 1 shows a case of a right-hand drive vehicle. In the case of a left-hand drive vehicle, the distance between the driver's viewpoint and the display system 20L on the left side will be about 50 cm-60 cm.

The embodiment addresses the issue by using a far-viewpoint display in the display systems 20R, 20L. A far-viewpoint display is configured such that the light output from the display device inside the housing is reflected by multiple reflecting surfaces inside the housing and output outside the housing, thereby extending the distance of sight from the observer to the display device. In the example shown in FIG. 1, the video displayed on the display system 20R on the right side is viewed as a virtual image VIR at a position farther than the display system 20R as viewed from the driver. For example, the distance from the viewpoint of the driver to the virtual image VIR on the right side is set to be in a range of 1 m-2 m. Similarly, the video displayed on the display system 20L on the left side is viewed as a virtual image VIL at a position farther than the display system 20L as viewed from the driver.

Using a far-viewpoint display in the display systems 20R, 20L reduces the change in the focal length while the driver is driving the vehicle and reduces the magnitude of focusing. This can mitigate the weariness of the driver's eyes. It will also contribute to prevention of accidents caused by elderly drivers. By displaying the virtual images VIR, VIL of the rear view near the positions where the conventional optical side mirrors are mounted, the driver can drive the vehicle, experiencing the same vehicle width as in the conventional type vehicle with optical side mirrors.

However, a far-viewpoint display has a narrow viewing angle and need be viewed substantially squarely. When a far-viewpoint display is used in the display systems 20R, 20L, a passenger in the assistant driver's seat needs to move the head to a position facing the far-viewpoint display straight in order to view a video displayed on the far-viewpoint display. As described above, confirmation of safety conditions behind is necessary when the passenger leaves the vehicle, too, so that it is desired to fully exploit the camera monitoring system at the time when the passenger leaves the vehicle.

Figure 2:
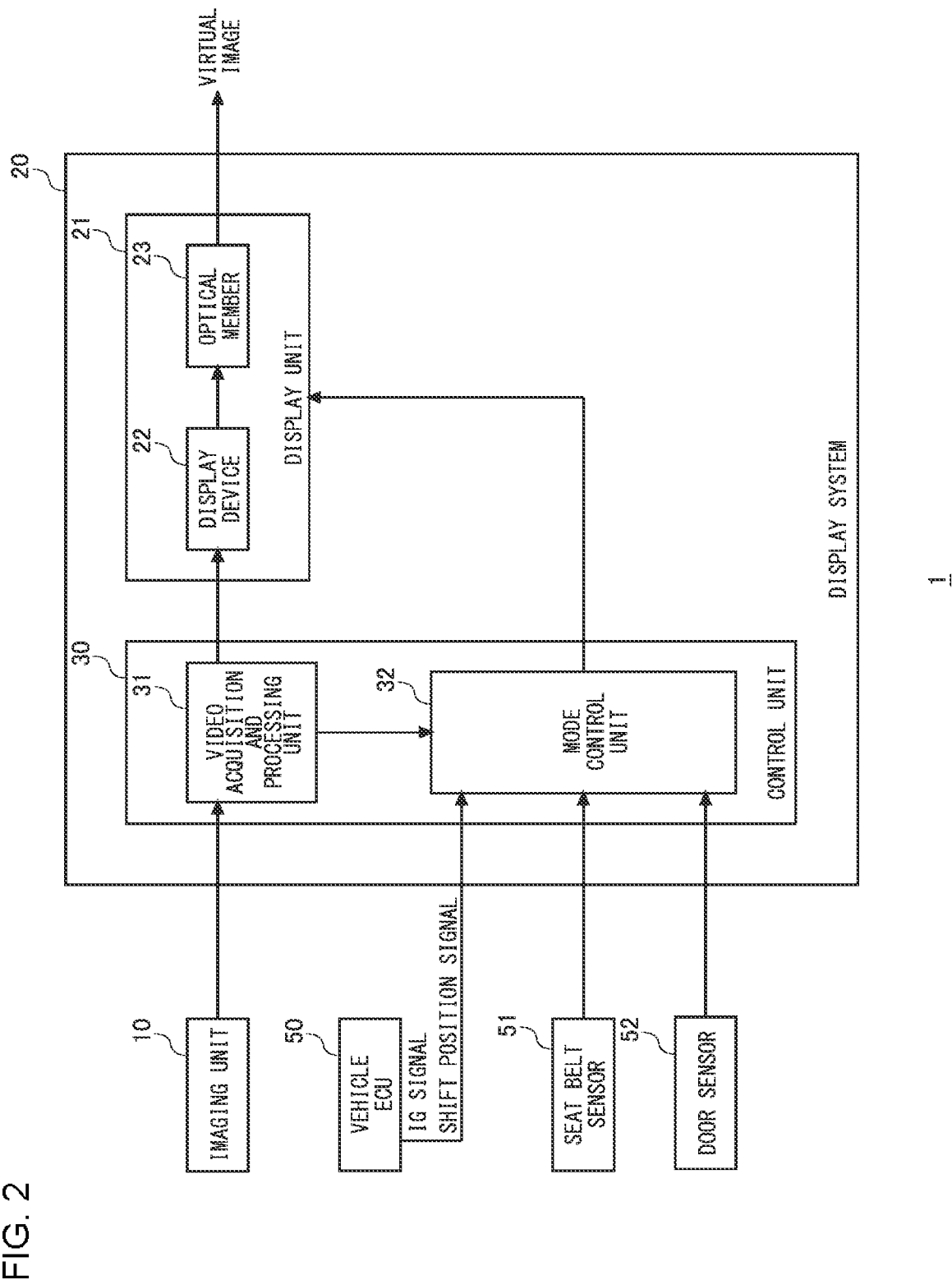
FIG. 2 shows an exemplary configuration of the camera monitoring system according to the embodiment.

FIG. 2 shows an exemplary configuration of the camera monitoring system according to the embodiment. The camera monitoring system includes an imaging unit 10 and a display system 20. The display system 20 includes a display unit 21 and a control unit 30. The display unit 21 includes a display device 22 and an optical member 23. An example of the internal configuration of the display system 20 will be described later. The control unit 30 includes a video acquisition and processing unit 31 and a mode control unit 32. The configuration of the camera monitoring system shown in FIG. 2 is a configuration for one side, and two camera monitoring systems including the camera monitoring system for the right side and the camera monitoring system for the left side are mounted on the vehicle 1. The imaging unit 10 and the display system 20 are connected by a cable. Wireless transmission is also possible provided that the reliability of data transfer is secured.

The imaging unit 10 includes a solid-state imaging device and a processing unit. A complementary metal oxide semiconductor (CMOS) image sensor or a charge coupled device (CCD) image sensor can be used in the solid-state imaging device. The solid-stage imaging device converts the light incident via a lens into an electrical video signal and outputs the video signal to the processing unit. The processing unit subjects the video signal input from the solid-state imaging device to a signal process such as A/D conversion and noise elimination. The processing unit can subject the video signal subjected to the signal process to various video processes such as tone correction, color correction, contour correction. The processing unit compresses the video signal subjected to the video processes based on a predetermined compression scheme and transmits the compressed video signal to the control unit 30 of the display system 20.

The control unit 30 can be realized by cooperation of hardware resources and software resources or only by hardware resources. A CPU, ROM, RAM, graphics processing unit (GPU), digital signal processor (DSP), application specific integrated circuit (ASIC), field-programmable gate array (FPGA), and other LSIs can be used as hardware resources. Programs such as firmware can be used as software resources. FIG. 2 depicts an example in which the control board on which the control unit 30 is implemented is provided in the housing of the display system 20. Alternatively, the control board on which the control unit 30 is implemented may be provided in a separate housing. In other words, the display system 20 may be configured as an apparatus having one housing or may be implemented by combining functions of apparatuses distributed in multiple housings.

The video acquisition and processing unit 31 of the control unit 30 receives the video signal from the imaging unit 10 and decompresses the receives video signal in a decompression scheme corresponding to the compression scheme. The video acquisition and processing unit 31 clips a video in a range that should be displayed on the display device 22 from each frame of the video acquired from the imaging unit 10. The video acquisition and processing unit 31 outputs the clipped video to the display device 22.

The mode control unit 32 switches the display mode of the display device 22 from a driver far-view mode to a passenger view mode when it is predicted that the passenger in the assistant driver's seat will leave the vehicle. The driver far-view mode is a mode in which the video is viewed farther than the position where the display unit 21 is physically installed and is a mode that makes it easier for the driver to drive the vehicle. The passenger view mode is a mode in which the visibility for a person leaving the vehicle is improved as compared with the driver far-view mode. Specific examples of the driver far-view mode and the passenger view mode will be described later.

The mode control unit 32 predicts whether the passenger in the assistant driver's seat will leave the vehicle based on signals from various sensors in the vehicle 1. For example, the mode control unit 32 predicts whether the passenger will leave the vehicle based on a sensing signal from a seat belt sensor 51 for sensing whether the seat belt of the assistant driver's seat is attached or detached. More specifically, the mode control unit 32 predicts that the passenger will leave the vehicle when the mode control unit 32 receives, from the seat belt sensor 51, a sensing signal indicating that the seat belt of the assistant driver's seat is detached.

The mode control unit 32 can also predict whether the passenger will leave the vehicle based on a sensing signal from a door sensor 52. For example, the mode control unit 32 may predict that the passenger will leave the vehicle when a sensing signal indicating that the door is unlocked from the door sensor 52 for sensing the door lock state. The mode control unit 32 may predict that the passenger will leave the vehicle when a sensing signal indicating that contact of the hand with the doorknob occurs from the door sensor 52 for sensing the contact of the hand with the doorknob. The mode control unit 32 may predict that the passenger will leave the vehicle when the mode control unit 32 receives a sensing signal indicating that the door is open from the door sensor 52 for sensing the opening and closing of the door.

Mode switch control for switching between the driver far-view mode and the passenger view mode need not be executed continuously but is executed under a certain condition. For example, mode switch control need not be executed when a passenger is not seated in the assistant driver's seat. The mode control unit 32 receives a detected value from a weight sensor (not shown) provided beneath the assistant driver's seat and determines whether a passenger is seated in the assistant driver's seat based on the detected value thus received. When a passenger is not seated, the mode control unit 32 does not initiate mode switch control.

The mode control unit 32 may determine whether a passenger is seated in the assistant driver's seat based on a video showing the vehicle interior captured by a camera (not shown) for imaging the vehicle interior. More specifically, the image recognition engine in the mode control unit 32 or the camera applies a predetermined image recognition algorithm to the video sowing the vehicle interior and determines whether a person is detected at the position of the assistant driver's seat in the video. When the image recognition engine in the camera is used for determination, the mode control unit 32 acquires the result of determination from the camera.

The mode switch control described above is basically executed while the vehicle 1 is at a stop. While the vehicle 1 is traveling, the mode is fixed to the driver far-view mode. The mode control unit 32 can sense the traveling condition of the vehicle 1 by receiving a shift position signal from a vehicle electronic control unit (ECU) 5. When the shift position is the parking position, the mode control unit 32 determines that the vehicle 1 is at a stop. When the shift position is the drive position or the backward drive position, the mode control unit 32 determines whether the vehicle 1 is temporarily at a stop by receiving a detected value from at least one of the brake position sensor, the accelerator position sensor and the vehicle speed sensor. The mode switch control is equally executed while the vehicle is temporarily at a stop. The mode switch control may equally be executed when the passenger detaches the seat belt to prepare to leave the vehicle while the vehicle 1 is slowing down immediately before a stop.

The mode switch control described above may be suspended when the vehicle 1 is parked in a safe place such as a parking lot because the danger of colliding with a motorcycle or a bicycle approaching from behind is low. For example, the mode control unit 32 determines whether the vehicle 1 is parked in a safe location based on a detected value from multiple sonars (not shown) provided around the vehicle 1. When a fixed object (e.g., wall, curbstone, other vehicle) is located to the left of the vehicle 1 and the distance to the fixed object is less than a predetermined value, it is determined that a motorcycle or a bicycle cannot enter and it is safe.

The mode control unit 32 receives an ignition signal from the vehicle ECU 5. When the ignition is turned on by the driver, the mode control unit 32 starts the display system 20 in the passenger view mode. The benefit of the driver far-view mode is smaller and the benefit of the passenger view mode, which is advantageous for confirmation of safety conditions around the vehicle, is larger immediately after the camera monitoring system is started because the vehicle has not started to travel. When the driver starts to drive the vehicle 1, the mode control unit 32 switches from the passenger view mode to the driver far-view mode.

When the driver turns the ignition off, the mode control unit 32 switches the display system 20 from the driver far-view mode to the passenger view mode. When the mode control unit 32 conforms that all of the passengers have left the vehicle, the mode control unit 32 turns off the camera monitoring system. For example, the mode control unit 32 determines whether all of the passengers have left the vehicle based on a detected value from the weight sensor provided beneath each seat. The mode control unit 32 may determine that all of the passengers have left the vehicle when the mode control unit 32 receives a signal indicating that the door is locked from the door sensors 52 of all doors. The mode control unit 32 may turn off the camera monitoring system after an elapse of a predetermined time since the point of time when the driver far-view mode is switched to the leave-the-vehicle viewpoint mode instead of confirming that all of the passengers have left the vehicle.

When switching from the driver far-view mode to the passenger view mode, the mode control unit 32 may issue a notification to prompt the passenger in the assistant driver's seat to view the display system 20 on the side of the assistant driver's seat. Normally, the passenger in the assistant driver's seat does not have a habit of viewing a video displayed on the display system 20 of the camera monitoring system on the side of the assistant driver's seat. Therefore, the passenger often does not view a video of a scene behind even if it is being displayed on the display system 20 on the side of the assistant driver's seat.

For example, an LED lamp (not shown) may be provided in the housing of the display system 20, and the mode control unit 32 may cause the LED lamp to blink when switching from the driver far-view mode to the passenger view mode. The mode control unit 32 may change the color emitted by the LED lamp to a noticeable color (e.g., red) when switching from the driver far-view mode to the passenger view mode.

A speaker (not shown) may be provided in the display system 20, and the mode control unit 32 may cause the speaker to output an alert sound or an alert message when switching from the driver far-view mode to the passenger view mode.

The mode control unit 32 may include a message alerting the passenger in the assistant driver's seat in the video displayed on the display system 20 when switching from the driver far-view mode to the passenger view mode. The mode control unit 32 may improve the brightness of the video displayed on the display system 20 when switching from the driver far-view mode to the passenger view mode.

The mode control unit 32 as described above can receive various signals from various sensors in the vehicle 1 or from the ECU 5 via a vehicle-mounted network (e.g., a controller area network (CAN) or a local interconnect network (LIN)). A particular sensor and the mode control unit 32 may be connected by a dedicated wire. A system configuration in which the function of the control unit 30 is integrated with the vehicle ECU 5 is also possible.

Figure 3:
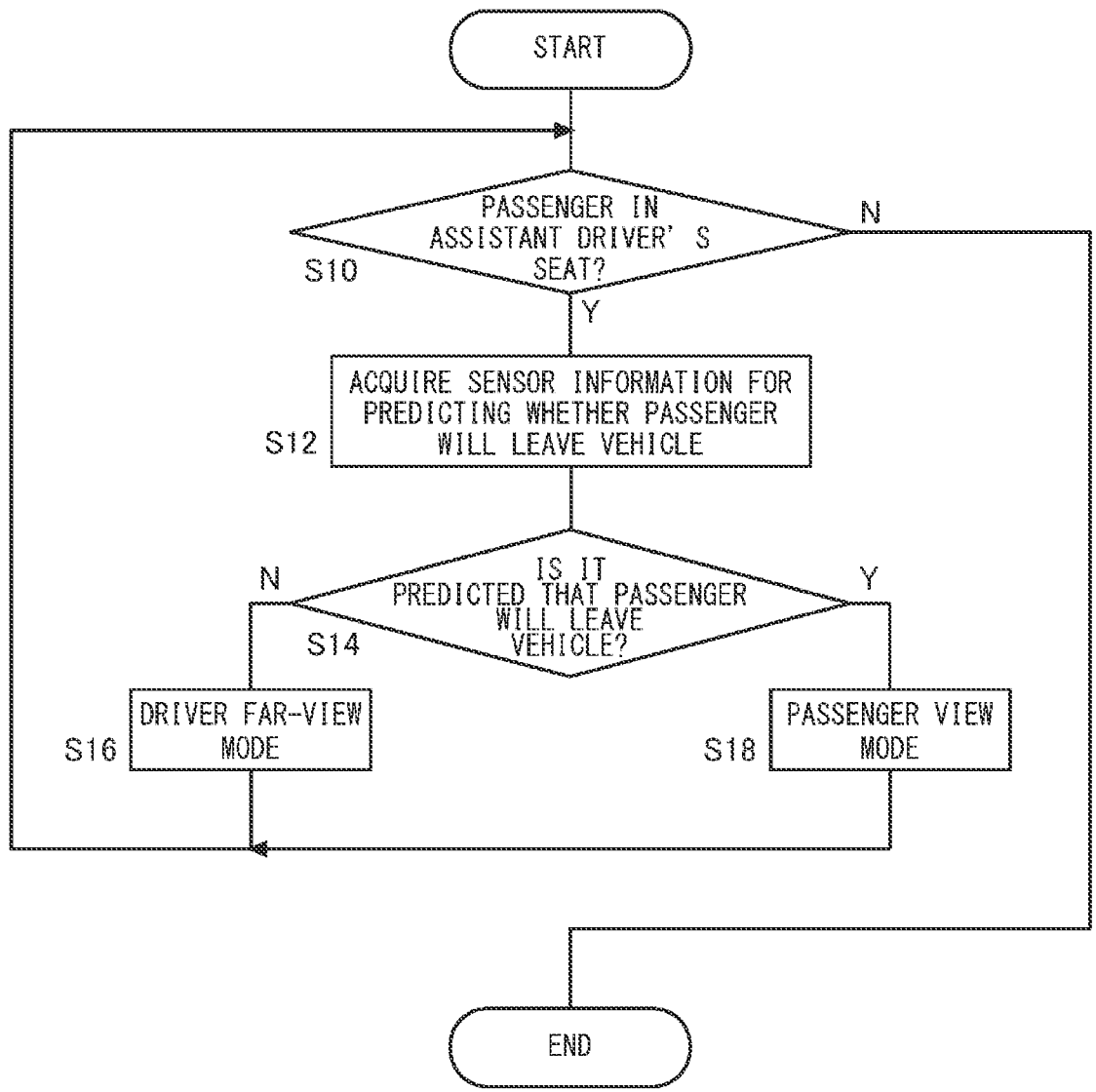
FIG. 3 is a flowchart showing a flow of mode switch control performed by the mode control unit according to an exemplary configuration 1 shown in FIG. 2.

FIG. 3 is a flowchart showing a flow of mode switch control performed by the mode control unit 32 according to an exemplary configuration 1 shown in FIG. 2. The mode control unit 32 determines whether a passenger is seated in the assistant driver's seat (S10). When a passenger is not seated (N in S10), the mode control unit 32 suspends mode switch control. When a passenger is seated (Y in S10), the mode control unit 32 acquires sensor information for predicting whether the passenger will leave the vehicle (S12). The mode control unit 32 predicts whether the passenger will leave the vehicle based on the acquired sensor information (S14). When it is not predicted that the passenger will leave the vehicle (N in S14), the mode control unit 32 selects the driver far-view mode (S16). When it is predicted that the passenger will leave the vehicle (Y in S14), the mode control unit 32 selects the passenger view mode (S18). The processes in steps S10-S18 described above are performed while the camera monitoring system is being activated.

Figure 4:
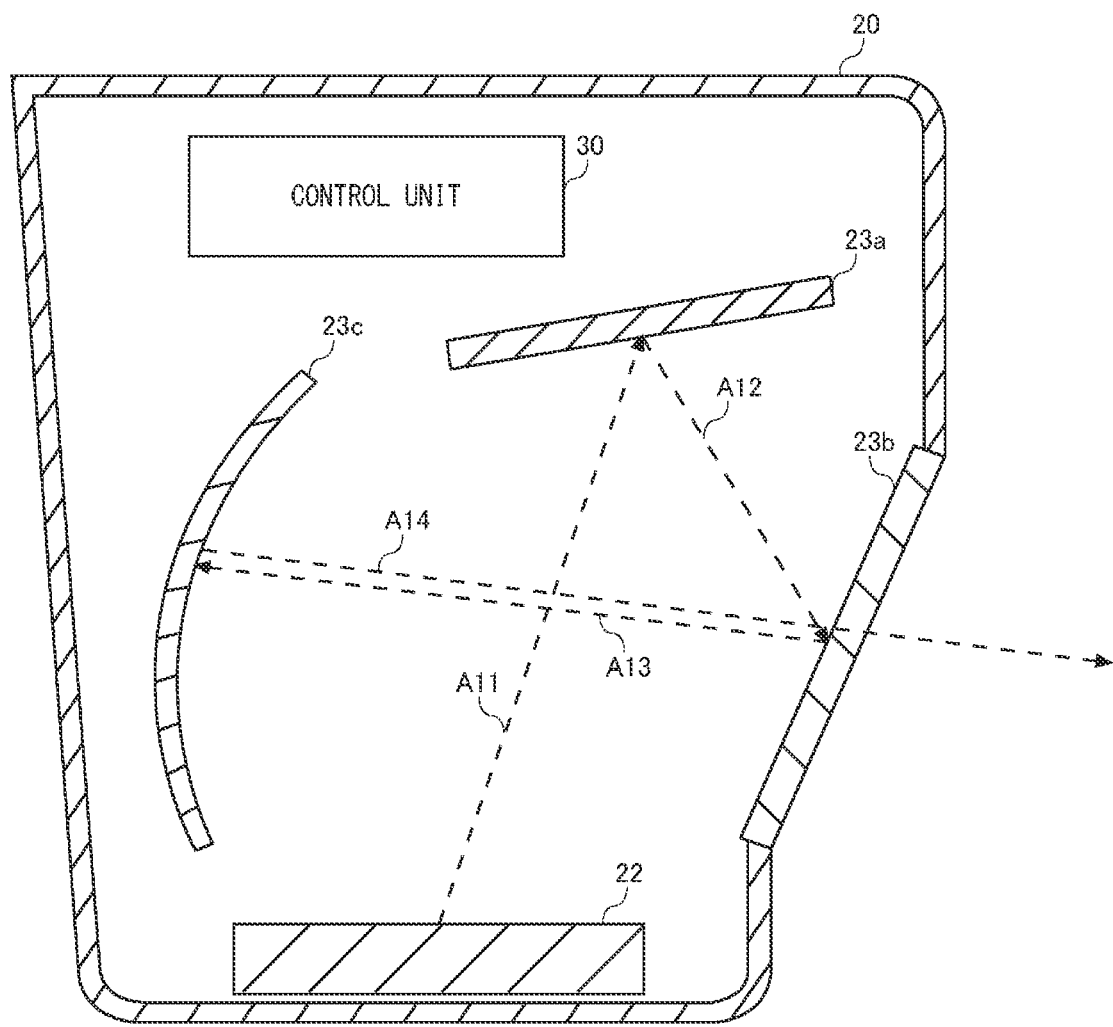
FIG. 4 shows an exemplary configuration of the display system according to the embodiment.

FIG. 4 shows an exemplary configuration of the display system 20 according to the embodiment. The housing of the display system 20 includes a display device 22, a first reflecting mirror 23a, a second reflecting mirror 23b, a third reflecting mirror 23c, and a control unit 30. The first reflecting mirror 23a and the second reflecting mirror 23b are provided on a light path between the display device 22 and the third reflecting mirror 23c that reflects the light emitted from the display device 22 to a space outside the display system 20.

The display device 22 is a display that serves as a light source. For example, a small liquid crystal display, organic EL display, or micro LED display can be used. The display device 22 is provided in the lower part of the housing such that the display surface faces upward. The first reflecting mirror 23a is exemplified by a planar mirror and is provided in the upper part of the housing such that the reflecting surface faces downward.

The second reflecting mirror 23b is comprised of a beam splitter formed to have a planar shape and is light transmissive. The second reflecting mirror 23b has a function of transmitting a portion of incident light and reflecting a portion thereof. In the example shown in FIG. 4, a half mirror having a 50% transmittance and a 50% reflectance is used. The second reflecting mirror 23b is mounted in the opening of the housing and is provided at a position adjacent to the display surface of the display device 22 and the reflecting surface of the first reflecting mirror 23a. The second reflecting mirror 23b is provided such that the direction normal to the reflecting surface diagonally intersects the direction of incidence (the direction parallel to a light path A12 in FIG. 4) of the reflected light from the first reflecting mirror 23a and the direction of incidence (the direction parallel to a light path A14 in FIG. 4) of the reflected light from the third reflecting mirror 23c.

The third reflecting mirror 23c is, for example, a concave mirror and is provided in the housing at a position adjacent to the display surface of the display device 22 and the reflecting surface of the first reflecting mirror 23a. The third reflecting mirror 23c is provided in the housing such that the reflecting surface of the third reflecting mirror 23c and the reflecting surface of the second reflecting mirror 23b face each other.

The first reflecting mirror 23a reflects the light emitted from the display device 22 toward the second reflecting mirror 23b. The second reflecting mirror 23b reflects the reflected light from the first reflecting mirror 23a toward the third reflecting mirror 23c. In other words, the light emitted from the display device 22 is reflected by the first reflecting mirror 23a and the second reflecting mirror 23b successively before being incident on the third reflecting mirror 23c. The third reflecting mirror 23c reflects the reflected light from the second reflecting mirror 23b toward the second reflecting mirror 23b. The reflected light from the third reflecting mirror 23c is transmitted through the second reflecting mirror 23b and is output outside the display system 20.

When an image is displayed on the display device 22, the image reflected by the third reflecting mirror 23c is transmitted through the beam splitter forming the second reflecting mirror 23b and is viewed by an observer (e.g., the driver) as a virtual image. The observer will view the image reflected by the first reflecting mirror 23a, the second reflecting mirror 23b, and the third reflecting mirror 23c. To the observer, the image appears to be displayed at a position farther than the third reflecting mirror 23c in a direction of seeing the third reflecting mirror 23c through the second reflecting mirror 23b.

In the configuration shown in FIG. 4, a light path A11 on which the light is transmitted from the display device 22 to the first reflecting mirror 23a and a light path A13 on which the light is transmitted from the second reflecting mirror 23b to the third reflecting mirror 23c intersect before the light emitted from the first display device 22 reaches the third reflecting mirror 23c. Since the light path A11 and the light path A13 intersect, the light path length from the display device 22 to the third reflecting mirror 23c can be extended, and, at the same time, the distance from the second reflecting mirror 23b to the third reflecting mirror 23c can be reduced. In other words, the distance of sight to the virtual image can be extended, and, at the same time, the size of the housing of the display system 20 can be reduced.

The control unit 30 implemented on the control board supplies a video signal acquired from the imaging unit 10 to the display device 22. The control board may be provided outside the housing of the display system 20.

Hereinafter, specific details of control executed in the passenger view mode will be described. When an ordinary monitor is used in the display system 20 as in an ordinary camera monitoring system, the monitor screen is viewable even if the screen is seen in a diagonal direction. Even when the monitor on the side of the assistant driver's seat is provided at an angle that makes it easy for the driver to see the monitor, for example, the passenger in the assistant driver's seat can view the screen of the monitor on the side of the assistant driver's seat. When a display with a wide viewing angle is used, in particular, it is also possible for the passenger in the assistant driver's seat to view the screen of the monitor on the side of the assistant driver's seat clearly. Therefore, it is also possible for the passenger in the assistant driver's seat to view the screen of the display system 20 on the side of the assistant driver's seat clearly by approximating the far-viewpoint display used in the display system 20 in the embodiment to the condition of an ordinary display. This would be addressed by configuring the distance of sight from the passenger in the assistant driver's seat to the display device 22 in the passenger view mode to be shorter than the distance in the driver far-view mode.

Figure 5:
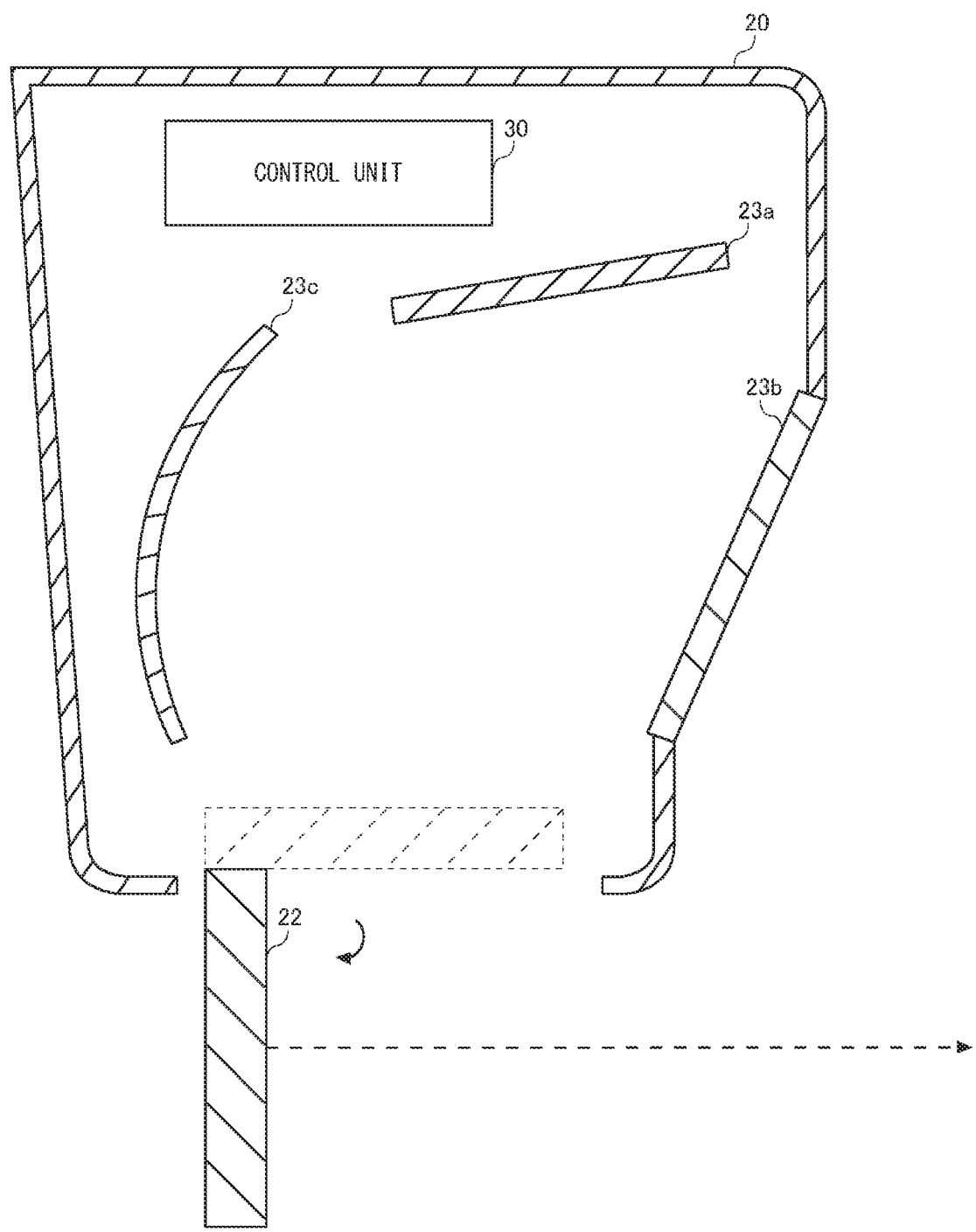
FIG. 5 shows an exemplary configuration 1 of the display system adapted to the passenger view mode.

FIG. 5 shows an exemplary configuration 1 of the display system 20 adapted to the passenger view mode. In the exemplary configuration 1 shown in FIG. 5, the lower surface of the housing of the display system 20 opens to expose the display device 22 outside the housing. In the exemplary configuration 1 shown in FIG. 5, after the lower surface of the housing of the display system 20 opens, the display device 22 is rotated downward by 90° in a direction in which the display surface faces the observer (e.g., the passenger) and is exposed below the housing. In this state, the observer will see the video displayed on the display device 22 directly. This reduces the distance of sight from the observer to the display device 22 and allows viewing the video in a larger size and a higher brightness than when the image reflected by the first reflecting mirror 23a, the second reflecting mirror 23b, and the third reflecting mirror 23c is viewed as a virtual image. It also extends the viewing angle in which viewing is possible and allows the video displayed on the display device 22 to be viewed in a diagonal direction as well.

Exposure of the display device 22 outside the housing also functions as a notification that prompts the passenger in the assistant driver's seat to see the display system 20 on the side of the assistant driver's seat. Exposure of the display device 22 outside the housing of the display system 20 on the side of the assistant driver's seat attracts the attention of the passenger to the display system 20 on the side of the assistant driver's seat.

When the display system 20 shown in FIG. 5 is configured upside down, the upper surface of the housing of the display system 20 opens, and the display device 22 will be rotated upward by 90° in a direction in which the display surface faces the observer and is exposed above the housing. The configuration of the display system 20 shown in FIG. 5 is by way of example only, and any configuration may be employed so long as it is possible to adjust the distance of sight from the observer to the display device 22.

Figure 6:
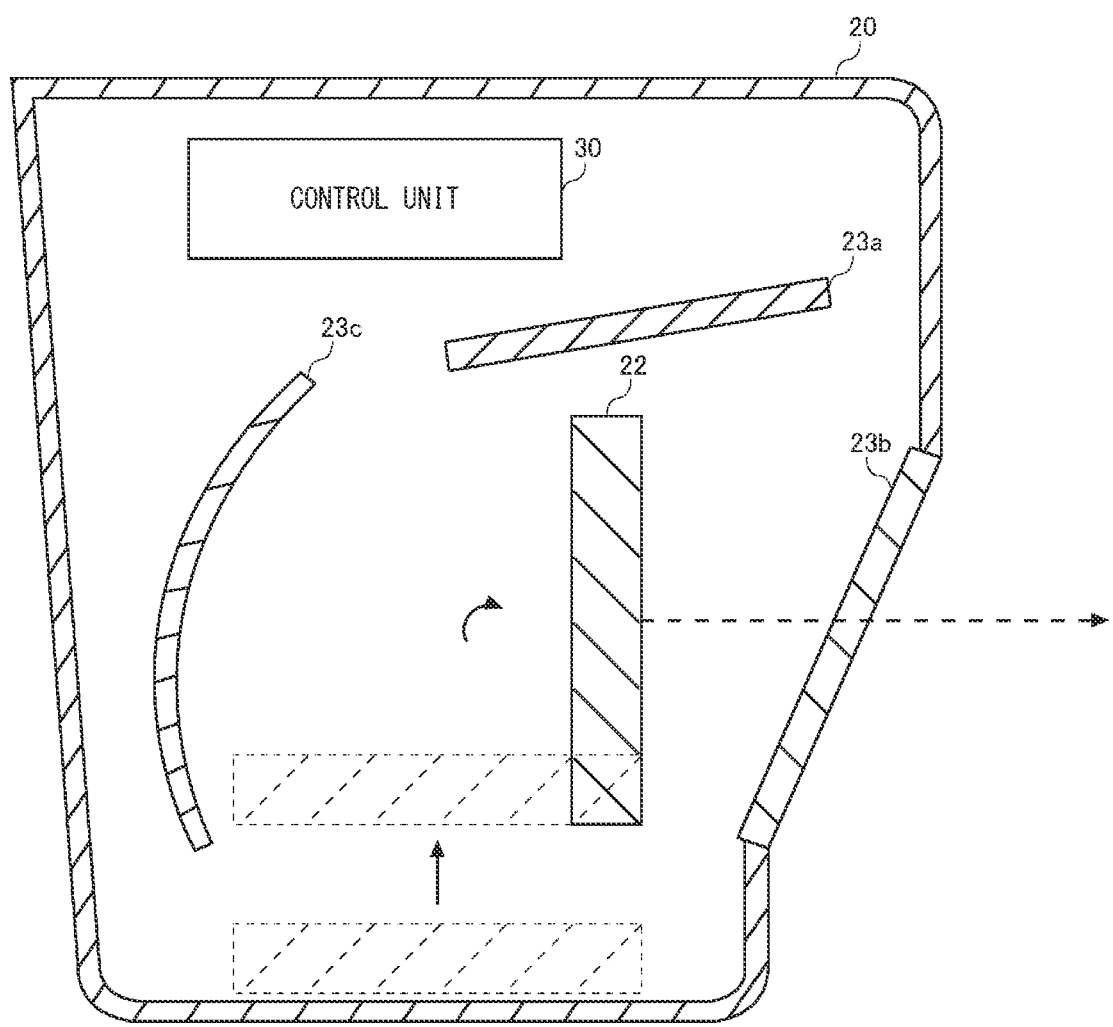
FIG. 6 shows an exemplary configuration 2 of the display system adapted to the passenger view mode.

FIG. 6 shows an exemplary configuration 2 of the display system 20 adapted to the passenger view mode. In the exemplary configuration 2 shown in FIG. 6, the display device 22 is caused to stand upright in the housing in a direction in which the display surface faces the second reflecting mirror 23b. In the example shown in FIG. 6, the display device 22 is lifted up to a position parallel to the second reflecting mirror 23b and is rotated upward by 90°. The display device 22 may be rotated to a position that faces the second reflecting mirror 23b in a parallel manner. This reduces the distance of sight from the observer to the display device 22. It also extends the viewing angle in which viewing is possible.

It is also possible to reduce the distance of sight from the observer to the display device 22 by switching an internal mechanism other than the display device 22. For example, the first reflecting mirror 23a may be moved to the position of the light path A14, and the angle of the first reflecting mirror 23a may be adjusted to reflect the light emitted from the display device 22 toward the second reflecting mirror 23b. This reduces the number of times of reflection and reduces the distance of sight from the observer to the display device 22.

Figure 7:
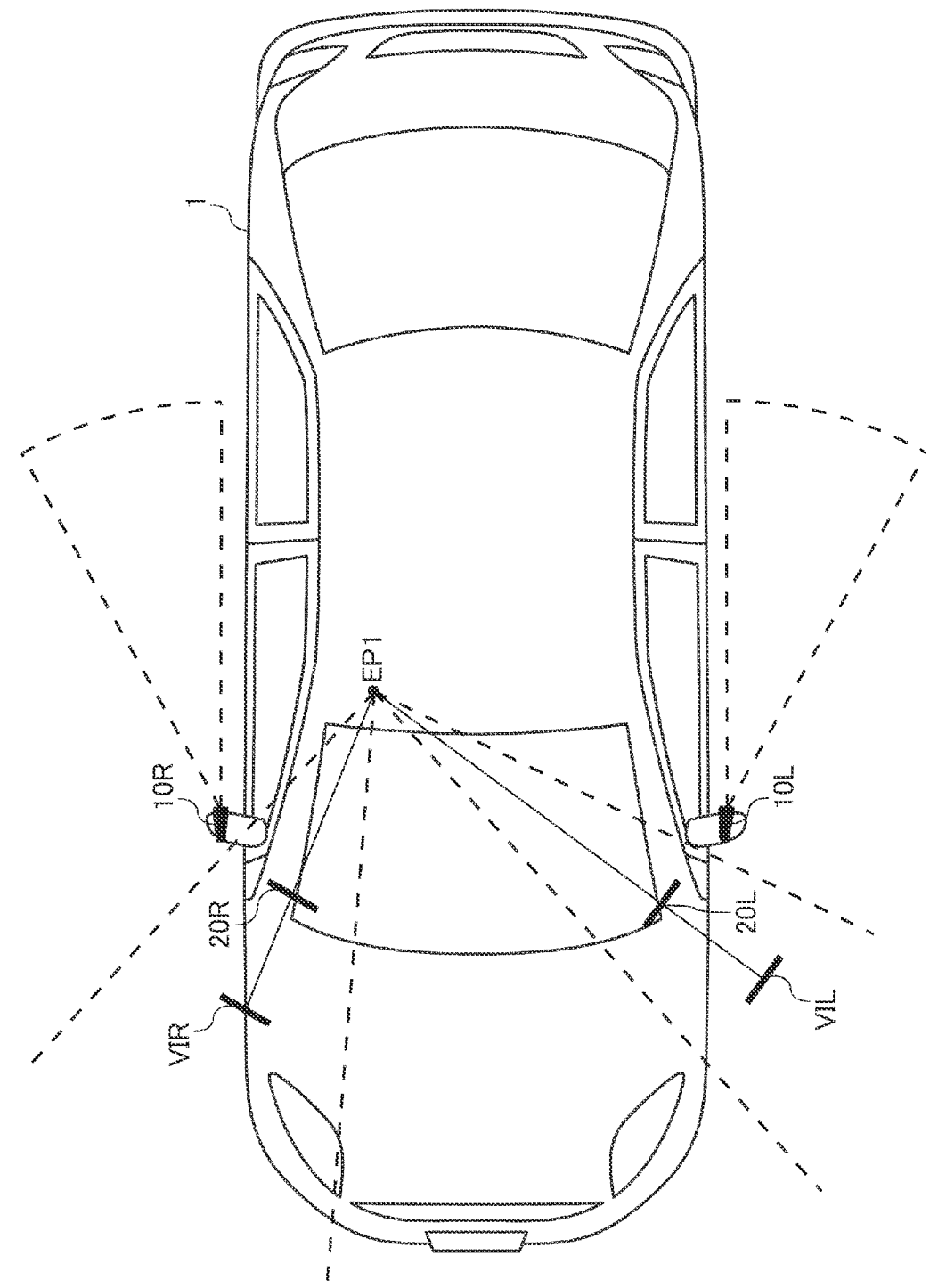
FIG. 7 is a view from above the vehicle showing the positions of installation of the imaging unit and the display system of the camera monitoring system according to the embodiment.

FIG. 7 is a view from above the vehicle 1 showing the positions of installation of the imaging unit 10 and the display system 20 of the camera monitoring system according to the embodiment. As shown in FIG. 1, the imaging unit 10R on the right side and the imaging unit 10L on the left side are provided at positions similar to the positions of the installation of ordinary optical door mirrors. The display system 20R on the right side is provided at the root of an A pillar 3R on the right side in the vehicle interior, and the display system 20L on the left side is provided at the root of an A pillar 3L on the left side. The display system 20R on the right side and the display system 20L on the left side are adjusted to angle that makes them easily viewable from the viewpoint EP1 of the driver. In this state, it is difficult for the passenger in the assistant driver's seat to view the video displayed on the display system 20L on the left side. This is addressed by adjusting, in the passenger view mode, the orientation of the display system 20L on the side of the assistant driver's seat to an angle suited to the viewpoint position of the passenger seated in the assistant driver's seat.

Figure 8:
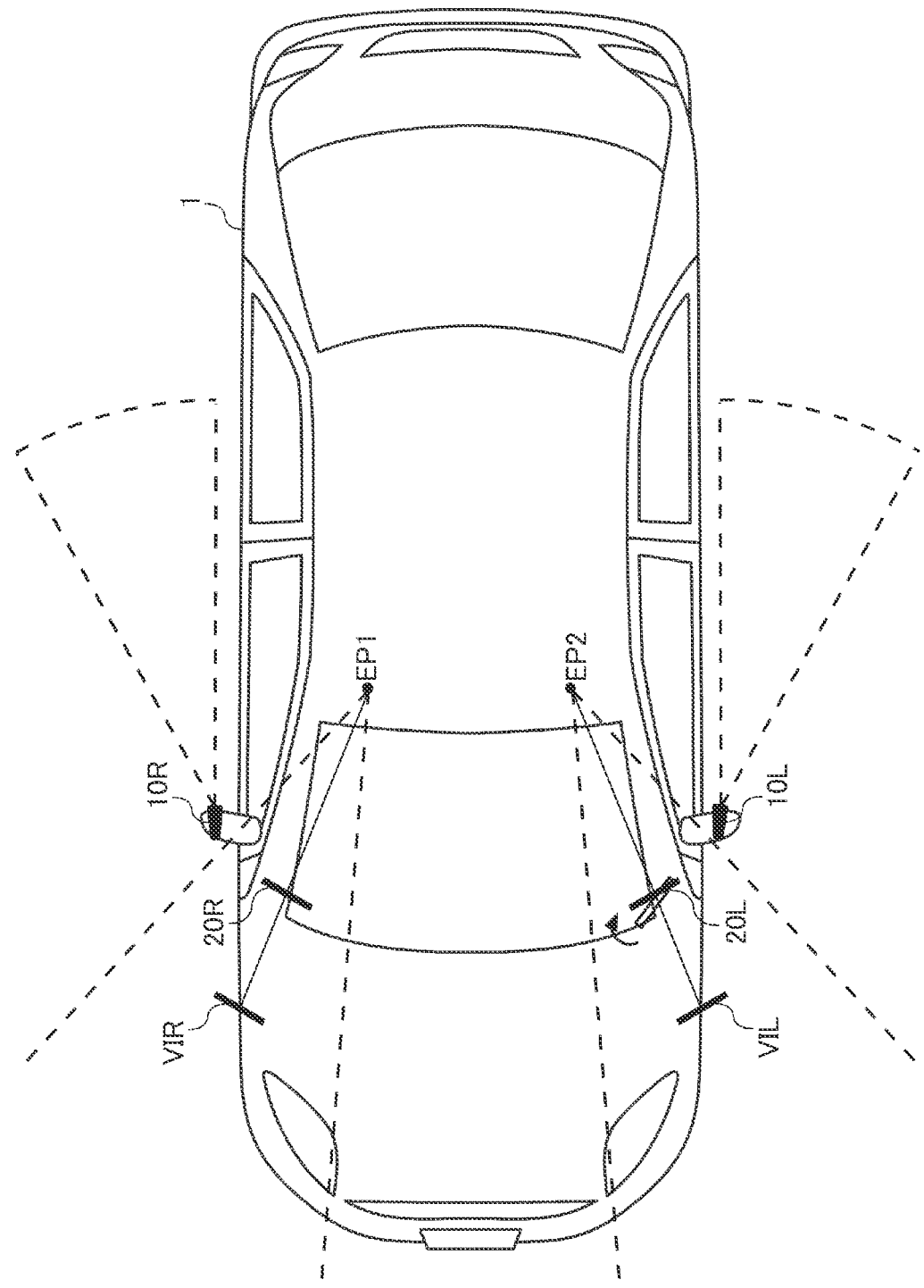
FIG. 8 shows a camera monitoring system in which the orientation of the display system on the side of the assistant driver's seat have been adjusted.

FIG. 8 shows a camera monitoring system in which the orientation of the display system 20L on the side of the assistant driver's seat have been adjusted. As shown in FIG. 8, the mode control unit 32 rotates, in the passenger view mode, the display system 20L on the left side in a direction toward the assistant driver's seat a predetermined angle. This can cause the display surface of the display system 20L on the left side to directly face the passenger seated in the assistant driver's seat and can improve the visibility of the video displayed on the display system 20L on the left side from the viewpoint EP2 of the passenger.

In the passenger view mode, it is desired to display a video of a wider angle on the display system 20L on the side of the assistant driver's seat so that the passenger leaving the vehicle can check safety conditions behind in a wide range. In order to display a video of a wide angle, it is useful to capture a video in a wide angle. For example, a standard lens and a wide lens may be mounted in the imaging unit 10L on the side of the assistant driver's seat, and the video captured via the wide lens may be displayed on the display system 20L on the side of the assistant driver's seat in the passenger view mode.

Figure 9:
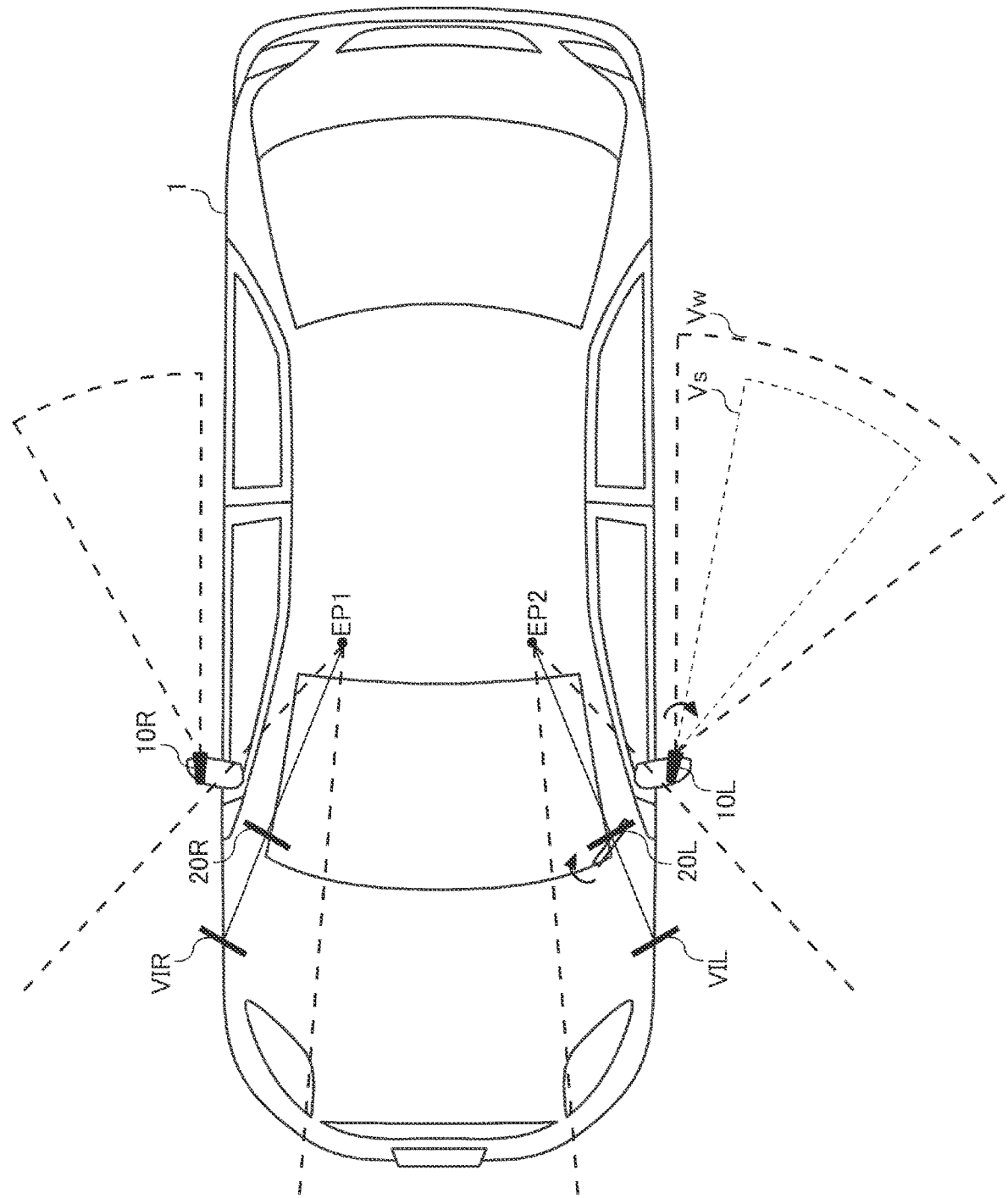
FIG. 9 shows a camera monitoring system that includes the imaging unit in which a standard lens and a wide lens are mounted.

FIG. 9 shows a camera monitoring system that includes the imaging unit 10L in which a standard lens and a wide lens are mounted. Referring to FIG. 9, a first field of view area Vs of the imaging unit 10L on the side of the assistant driver's seat represents a field of view area in which a video can be captured via the standard lens, and a second field of view area Vw represents a field of view area in which a video can be captured via the wide lens. In the passenger view mode, the mode control unit 32 rotates the orientation of the imaging unit 10L on the side of the assistant driver's seat by a predetermined angle toward a space outside the vehicle 1 and also causes the imaging unit 10L on the side of the assistant driver's seat to capture a video by using the wide lens.

In order to allow the passenger leaving the vehicle to check safety conditions behind in a wide range, it is also useful to display the video captured by the imaging unit 10 provided in the frontal position of the vehicle 1.

Figure 10:
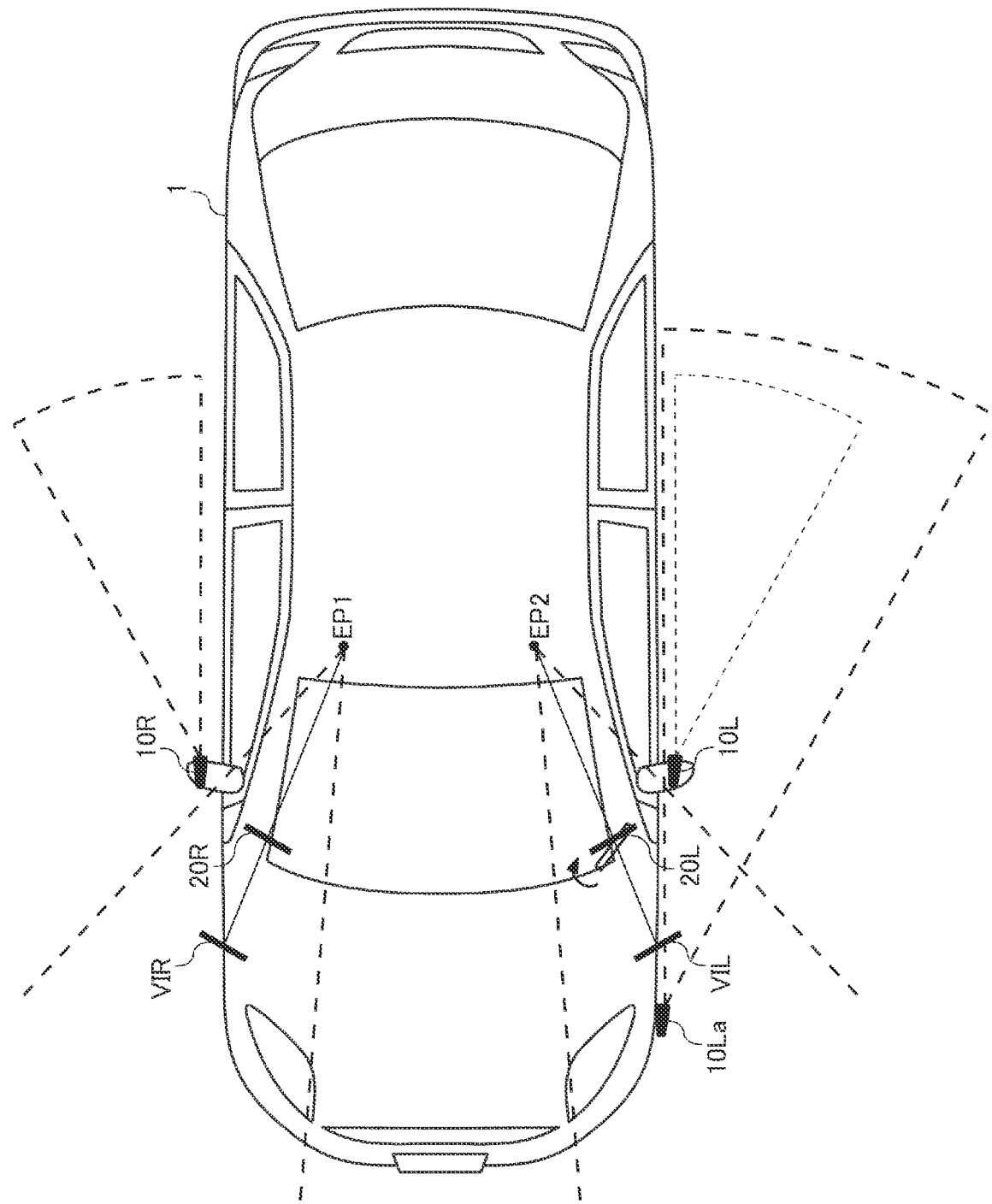
FIG. 10 shows a camera monitoring system in which a further imaging unit is provided on the hood in front of the assistant driver's seat.

FIG. 10 shows a camera monitoring system in which a further imaging unit 10La is provided on the hood in front of the assistant driver's seat. Referring to FIG. 10, the further imaging unit 10La is provided near the position where the fender mirror is provided. In the passenger view mode, the mode control unit 32 cause the imaging unit 10La provided in front to capture a video of a scene behind the vehicle 1 and transmit the captured video to the display system 20L toward the assistant driver's seat. This allows the passenger leaving the vehicle to view a video in a wide range and improves the safety of the passenger leaving the vehicle.

To allow the passenger leaving the vehicle to check safety conditions behind in a wide range, the video acquisition and processing unit 31 may enlarge a range clipped from each frame in the video acquired from the imaging unit 10L in the passenger view mode.

Figure 11:
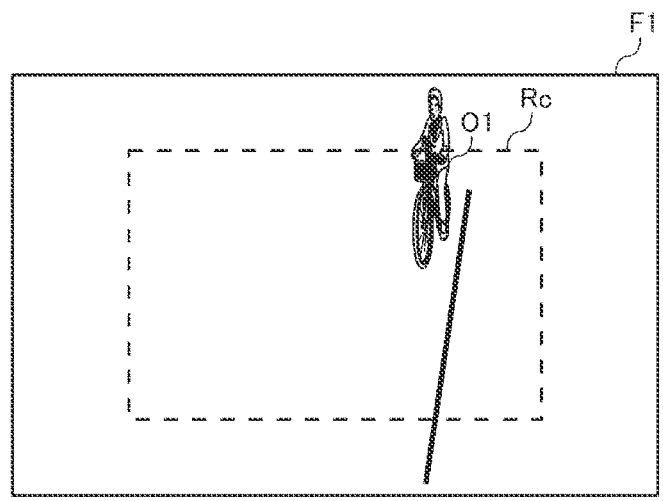
FIG. 11 shows an example of a range clipped from a frame of a video acquired from the imaging unit.

FIG. 11 shows an example of a range clipped from a frame of a video acquired from the imaging unit 10L. The range of a frame F1 that the video acquisition and processing unit 31 acquires from the imaging unit 10L may be a range corresponding to the imaging range of the solid-state imaging device or may be a range smaller than the imaging range. In the driver far-view mode, the video acquisition and processing unit 31 clips a video in a predetermined clipping area Rc from the range of the frame F1 of the acquired video, adjusts the size of the clipped video, and outputs the adjusted video to the display device 22. In the passenger view mode, the video acquisition and processing unit 31 clips a video in a range wider than the clipping area Rc, adjusts the size of the clipped video, and outputs the adjusted video to the display device 22. In the passenger view mode, the video acquisition and processing unit 31 may output the video acquired from the imaging unit 10L directly to the display device 22. In the example shown in FIG. 11, the entirety of a bicycle O1 approaching from behind will be captured in the video by enlarging the clipping area Rc.

In the passenger view mode, the video acquisition and processing unit 31 may shift the clipping area Rc in a direction outward from the vehicle 1. In the passenger view mode, the video acquisition and processing unit 31 may shift the clipping area Rc in a direction downward from the vehicle 1. In the passenger view mode, the video acquisition and processing unit 31 may shift the clipping area Rc in a direction outward and downward from the vehicle 1. In any case, the blind angle in the video viewed by the passenger leaving the vehicle can be reduced, and the safety of the passenger leaving the vehicle is improved.

When switching from the driver far-view mode to the passenger view mode, the mode control unit 32 executes at least one of the control to adjust the orientation of the display system 20, the control to reduce the distance of sight from the passenger to the display device 22, the control to switch the displayed video to wide angle, and the control to change the clipping area Rc described above. The mode control unit 32 may execute all of these modes of control or one or some of them.

Figure 12:
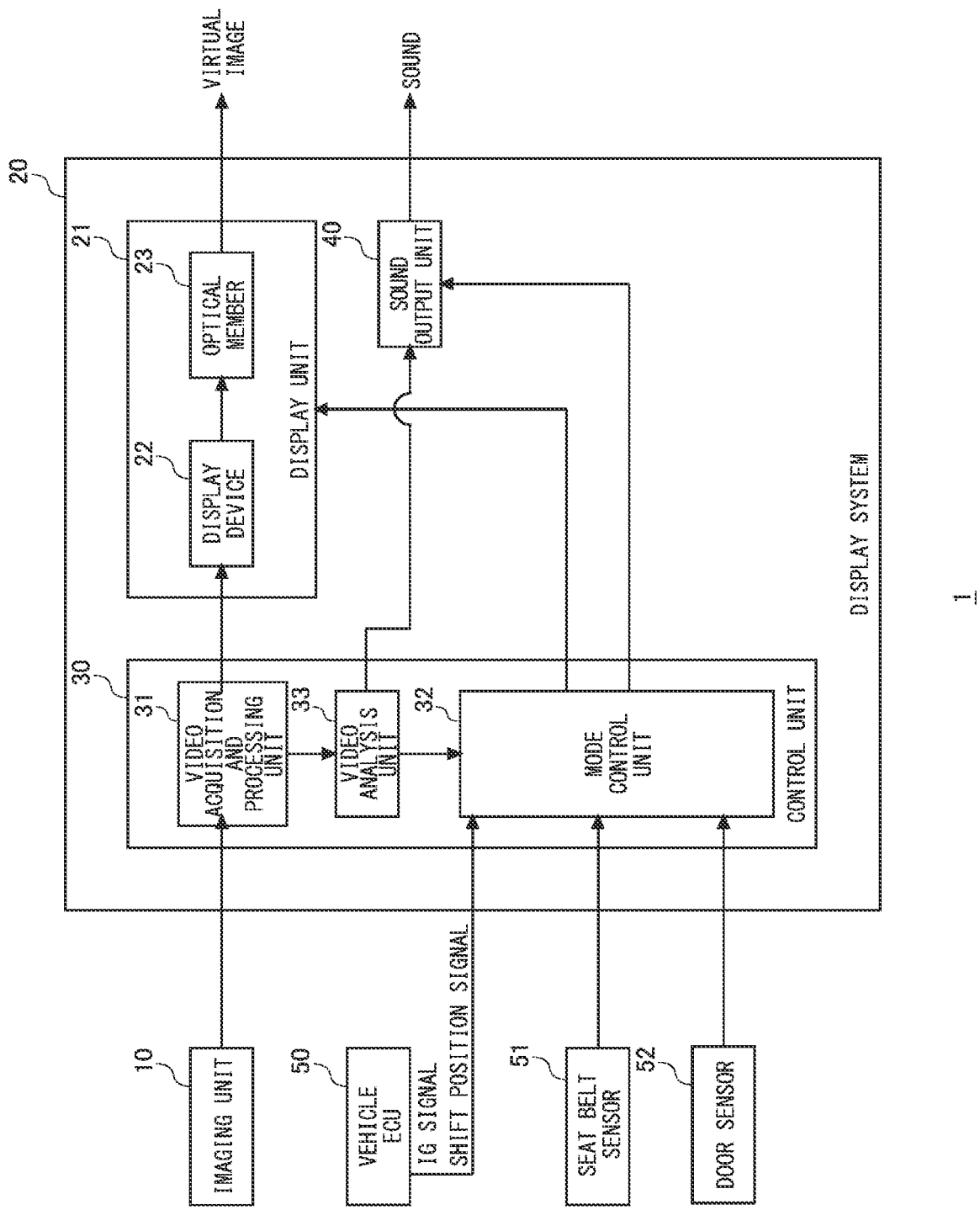
FIG. 12 shows an exemplary configuration 2 of the camera monitoring system according to the embodiment.

FIG. 12 shows an exemplary configuration 2 of the camera monitoring system according to the embodiment. In the exemplary configuration 2, a sound output unit 40 is added to the display system 20 shown in FIG. 2, and a video analysis unit 33 is added to the control unit 30. The sound output unit 40 includes a speaker. The video analysis unit 33 includes an image recognition engine.

The video analysis unit 33 applies a predetermined image recognition algorithm to the video acquired from the imaging unit 10 to detect an object (e.g., another vehicle, a bicycle, a motorcycle) located behind the vehicle 1. When an object located behind the vehicle 1 is detected in the video acquired from the imaging unit 10, the video analysis unit 33 estimates a distance between the vehicle 1 and the object located behind the vehicle 1. When the estimated distance is less than a predetermined value, the mode control unit 32 causes the sound output unit 40 to output an alert sound or an alert message to notify and alert the driver of the presence of the object. This can improve the safety while the vehicle is being driven.

Figure 13:
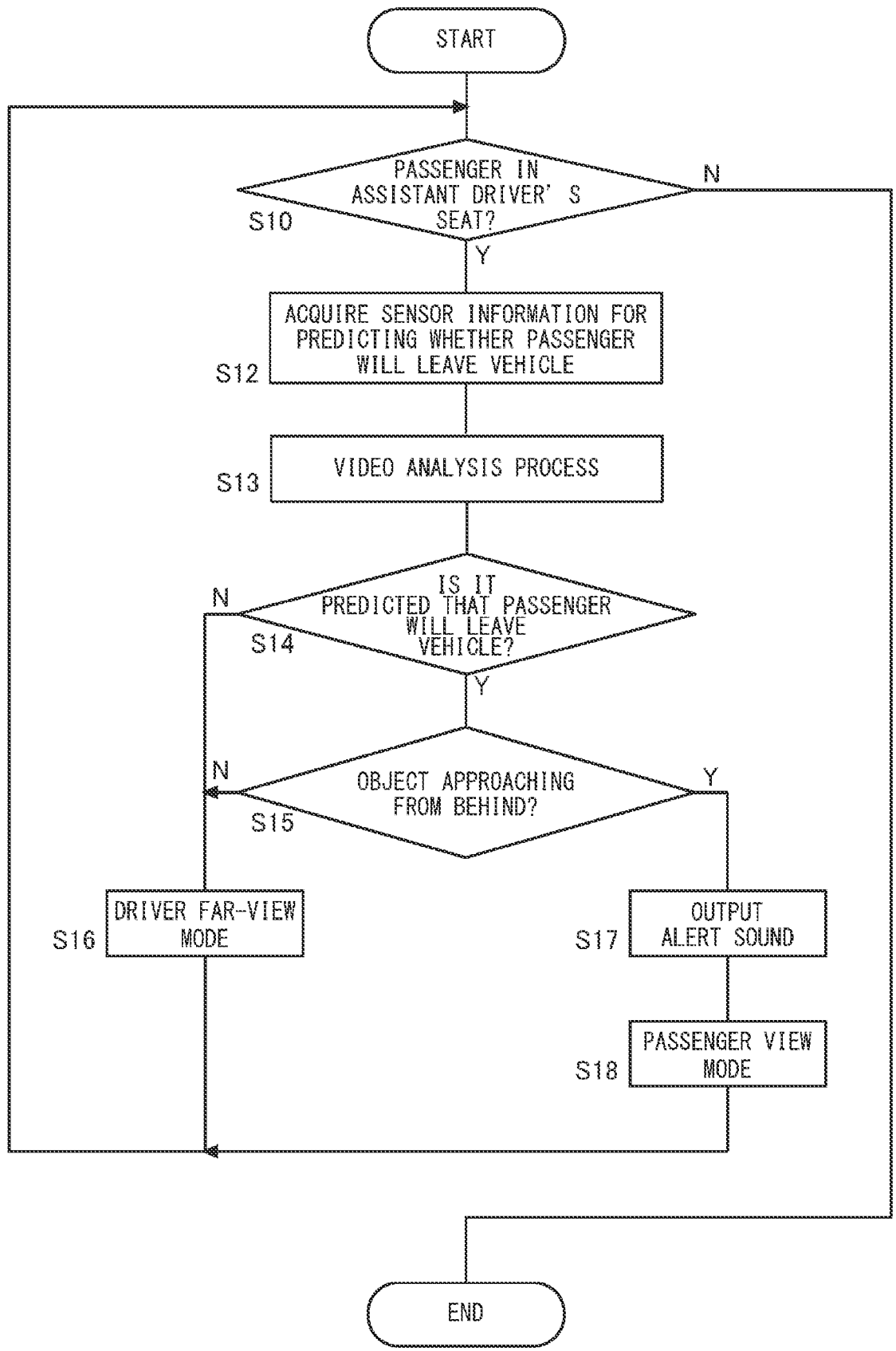
FIG. 13 is a flowchart showing a flow of mode switch control performed by the mode control unit according to the exemplary configuration 2 shown in FIG. 12.

FIG. 13 is a flowchart showing a flow of mode switch control performed by the mode control unit 32 according to the exemplary configuration 2 shown in FIG. 12. The mode control unit 32 determines whether a passenger is seated in the assistant driver's seat (S10). When a passenger is not seated (N in S10), the mode control unit 32 suspends mode switch control. When a passenger is seated (Y in S10), the mode control unit 32 acquires sensor information for predicting whether the passenger will leave the vehicle (S12). The video analysis unit 33 detects whether there is an object approaching from behind the vehicle 1 in the video acquired from the imaging unit 10 (S13). The mode control unit 32 predicts whether the passenger will leave the vehicle based on the acquired sensor information (S14). When it is not predicted that the passenger will leave the vehicle (N in S14), the mode control unit 32 selects the driver far-view mode (S16).

When it is predicted that the passenger will leave the vehicle (Y in S14), the mode control unit 32 determines whether there is an object approaching from behind the vehicle 1 based on the result of analysis by the video analysis unit 33 (S15). Whether an object is approaching the vehicle 1 can be determined based on a motion vector of the object. When there is not any object approaching from behind (N in S15), the mode control unit 32 selects the driver far-view mode (S16). When there is an object approaching from behind (Y in S15), the mode control unit 32 causes the sound output unit 40 to output an alert sound or an alert message to notify and alert the passenger in the assistant driver's seat of the approaching object (S17). The mode control unit 32 selects the passenger view mode (S18). The processes in steps S10-S18 described above are performed while the camera monitoring system is being activated.

Thus, in the exemplary configuration 2 of the camera monitoring system, the mode is not switched to the passenger view mode and the driver far-view mode is maintained in the absence of an object approaching the vehicle 1 from behind even if it is predicted that the passenger in the assistant driver's seat will leave the vehicle. In the absence of an object approaching from behind, the danger of collision with a motorcycle or a bicycle approaching from behind is low so that it is permitted to omit switching to the passenger view mode.

As described above, according to the embodiment, visibility for the passenger in the assistant driver's seat leaving the vehicle can be improved by switching the display system 20 from the driver far-view mode to the passenger view mode when the passenger leaves the vehicle. This can improve the safety of the passenger leaving the vehicle.

Described above is an explanation of the present disclosure based on the embodiment. The embodiment is intended to be illustrative only and it will be understood by those skilled in the art that various modifications to constituting elements and processes could be developed and that such modifications are also within the scope of the present disclosure.

In the embodiment described above, an example is given in which the safety of the passenger in the assistant driver's seat leaving the vehicle is improved by improving visibility of the display system 20 on the side of the assistant driver's seat when the passenger leaves the vehicle. In this regard, the present disclosure is applicable to improvement of the safety of the passenger in the rear seat leaving the vehicle.

Figure 14:
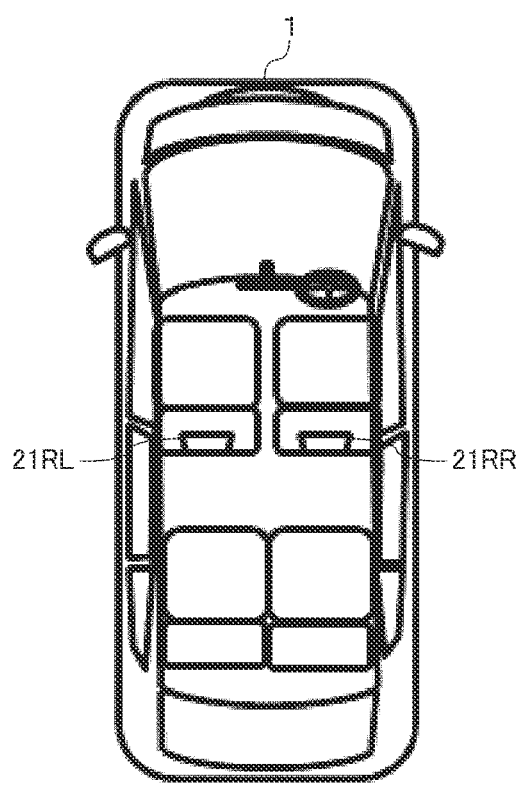
FIG. 14 shows an exemplary installation of a display unit for the rear right seat and a display unit for the rear left seat.

FIG. 14 shows an exemplary installation of a display unit 21RR for the rear right seat and a display unit 21RL for the rear left seat. Recently, rear seat entertainment device (RSE) is mounted on an increasing number of vehicles 1. In the example shown in FIG. 14, as a RSE, the display unit 21RR for the rear right seat is provided behind the head rest of the driver's seat, and the display unit 21RL for the rear left seat is provided behind the head rest of the assistant driver's seat.

When it is predicted that the passenger in the rear right seat will leave the vehicle, the mode control unit 32 causes the display unit 21RR for the rear right seat to display the video captured by the imaging unit 10R on the right. When it is predicted that the passenger in the rear left seat will leave the vehicle, the mode control unit 32 causes the display unit 21RL for the rear left seat to display the video captured by the imaging unit 10L on the left. This can improve the safety of the passenger in the rear seat leaving the vehicle.

In the embodiment described above, a description is given of control whereby the display system 20 on the side of the assistant driver's seat is switched from the driver far-view mode to the passenger view mode when the passenger in the assistant driver's seat leaves the vehicle. The display system 20 on the side of the driver's seat may be switched from the driver far-view mode to the passenger view mode when the driver leaves the vehicle. In this case, the control to adjust the orientation of the display system 20 shown in FIG. 8 will not be applied, but the control to reduce the distance of sight from the driver to the display device 22, the control to switch the displayed video to wide angle, and the control to change the clipping area Rc are applicable.

In the embodiment described above, a description is given of an example in which a far-viewpoint display is used in the display system 20. Alternatively, a head-up display (HUD) may be used in the display system 20. When a combiner HUD is used, visibility of a virtual image viewed from the passenger or the driver can be adjusted by adjusting the position and angle of the combiner. For example, the mode control unit 32 can improve visibility of a virtual image viewed from the passenger or the driver in the passenger view mode by bringing the position of the combiner closer to the passenger or the driver. Further, in the passenger view mode, the mode control unit 32 can cause the combiner on the side of the assistant driver's seat to directly face the passenger in the assistant driver's seat to improve visibility of a virtual image viewed from the passenger by rotating the combiner on the side of the assistant driver's seat toward the assistant driver's seat by a predetermined angle. The mode control unit 32 can execute the control to switch the displayed video to wide angle and the control to change the clipping area Rc equally in the case a HUD is used in the display system 20.

In the embodiment described above, a description is given of an example in which a far-viewpoint display is used in the display system 20. This does not exclude using an ordinary monitor in the display system 20. When an ordinary monitor is used, the mode control unit 32 can equally execute the control to adjust the orientation of the display system 20, the control to switch the displayed video to wide angle, and the control to change the clipping area Rc when the passenger leaves the vehicle. Further, the mode control unit 32 can execute the control to switch the displayed video to wide angle, and the control to change the clipping area Rc when the driver leaves the vehicle.

The embodiments may be defined by the following aspects.

[Aspect 1]

A display system (20) including: a video acquisition unit (31) that acquires a video from an imaging unit (10) provided in a vehicle (1) to capture a scene around the vehicle (1); a display unit (21) provided in the vehicle (1) to display the video captured by the imaging unit (10); and a control unit (32) that switches, when it is predicted that a passenger of the vehicle (1) will leave the vehicle (1), a mode of the display system (20) to a mode in which visibility for the passenger is improved.

According to the system, the safety of the passenger leaving the vehicle can be improved.

[Aspect 2]

The display system (20) according to aspect 1, wherein the display unit (21) includes a display device (22) and a plurality of reflecting surfaces (23) in a housing, and a distance of sight from the passenger to the display device (22) is extended by causing light emitted from the display device (22) to be reflected by the plurality of reflecting surfaces (23) and output outside the housing.

According to the system, the change in the focal length while the driver is driving the vehicle can be reduced.

[Aspect 3]

The display system (20) according to aspect 2, wherein, when it is predicted that the passenger will leave the vehicle (1), the control unit (32) switches to the mode in which the visibility is improved by switching to a mode in which a distance of sight from the passenger to the display device (22) is reduced.

According to the system, visibility for the passenger leaving the vehicle can be improved.

[Aspect 4]

The display system (20) according to aspect 3, wherein, when it is predicted that the passenger will leave the vehicle (1), the control unit (32) causes the display device (22) in the housing to be exposed outside the housing.

According to the system, the distance of sight from the passenger to the display device (22) can be reduced. It can also extend the viewing angle in which viewing is possible.

[Aspect 5]

The display system (20) according to aspect 3, wherein, when it is predicted that the passenger will leave the vehicle (1), the control unit (32) causes the display device (22) in the housing to be moved to reduce the distance of sight from the passenger to the display device (22).

According to this system, the distance of sight from the passenger to the display device (22) can be reduced.

[Aspect 6]

The display system (20) according to any one of aspects 1 through 5, wherein, when it is predicted that the passenger will leave the vehicle (1), the control unit (32) switches a video displayed on the display (21) unit to a wide angle video.

According to the system, visibility for the passenger leaving the vehicle can be improved.

[Aspect 7]

The display system (20) according to any one of aspects 1 through 6, wherein the display system (20) is provided on the side of a driver's seat and on the side of an assistant driver's seat, an orientation of a display system (20L) on the side of the assistant driver's seat is adjusted to an angle suited to a viewpoint position of a driver seated in the driver's seat, the passenger is a passenger seated in the assistant driver's seat of the vehicle (1), and, when it is predicted that the passenger will leave the vehicle (1), the control unit (32) adjusts the orientation of the display system (20L) on the side of the assistant driver's seat to angle suited to a viewpoint position of the passenger seated in the assistant driver's seat.

According to the system, visibility for the passenger leaving the vehicle from the assistant driver's seat can be improved.

[Aspect 8]

The display system (20) according to any one of aspects 1 through 7, wherein, when a sensing signal indicating that a seat belt worn by the passenger is detached, the control unit (32) predicts that the passenger will leave the vehicle (1).

According to the system, it is possible to predict whether the passenger will leave the vehicle accurately.

[Aspect 9]

The display system (20) according to any one of aspects 1 through 8, further including: a video analysis unit (33) that analyzes the video captured by the imaging unit (10), wherein the control unit (32) determines whether there is an object approaching the vehicle (1) from behind based on a result of analysis of the video and does not switch the mode of the display system (20) in the absence of an object approaching the vehicle (1) from behind even if it is predicted that the passenger will leave the vehicle (1).

According to the system, it is possible to reduce the frequency of mode switching while also securing the safety.

[Aspect 10]

The display system (20) according to aspect 1, wherein the passenger is a passenger seated in a rear seat of the vehicle (1), the display unit (21) is a display unit (21) for the rear seat, and, when it is predicted that the passenger will leave the vehicle (1), the control unit (32) causes the display unit (21) for the rear seat to display the video captured by the imaging unit (10).

According to the system, the safety of the passenger leaving the vehicle from the rear seat can be improved.

[Aspect 11]

A camera monitoring system including: an imaging unit (10) provided in a vehicle (1) to capture a scene around the vehicle (1); a display unit (21) provided in the vehicle (1) to display a video captured by the imaging unit (10); and a control unit (32) that switches, when it is predicted that a passenger of the vehicle (1) will leave the vehicle (1), a mode of a display system (20) to a mode in which visibility for the passenger is improved.

According to the system, the safety of the passenger leaving the vehicle can be improved.

[Aspect 12]

A display method including: acquiring a video from an imaging unit (10) provided in a vehicle (1) to capture a scene around the vehicle (1); causing a display unit (21) provided in the vehicle (1) to display the video captured by the imaging unit (10); and switching, when it is predicted that a passenger of the vehicle (1) will leave the vehicle (1), a mode of a display system (20) to a mode in which visibility for the passenger is improved.

According to the system, the safety of the passenger leaving the vehicle can be improved.

[Aspect 13]

A display program including computer-implemented modules including: a module that acquires a video from an imaging unit (10) provided in a vehicle (1) to capture a scene around the vehicle (1); a module that causes a display unit (21) provided in the vehicle (1) to display the video captured by the imaging unit (10); and a module that that switches, when it is predicted that a passenger of the vehicle (1) will leave the vehicle (1), a mode of a display system (20) to a mode in which visibility for the passenger is improved.

According to the system, the safety of the passenger leaving the vehicle can be improved.

CROSS-REFERENCE TO RELATED APPLICATION

This application is a Continuation of International Application No. PCT/JP2020/041949, filed on Nov. 10, 2020, which in turn claims the benefit of Japanese Application No. 2020-019008, filed on Feb. 6, 2020, the disclosures of which Applications are incorporated by reference herein.

What is claimed is:

1. A display system comprising:
a display provided in a vehicle to display a video captured by a camera provided in the vehicle to capture a scene around the vehicle;
a controller that switches, when it is predicted that a passenger of the vehicle will leave the vehicle, a mode of the display system to a first mode, in which a distance of sight from the passenger to the display is reduced; and
a plurality of reflecting surfaces in a housing, wherein
the display is in the housing,
light emitted from the display is reflected by the plurality of reflecting surfaces and is output outside the housing, and
when it is predicted that the passenger will leave the vehicle, the controller switches to the first mode by causing the display in the housing to be exposed outside the housing.

2. The display system according to claim 1, wherein when it is predicted that the passenger will leave the vehicle, the controller switches a video displayed on the display to a wide angle video.

3. The display system according to claim 1, wherein the display system is provided on the side of a driver's seat and on the side of a front passenger seat,
an orientation of the display system on the side of the front passenger seat is adjusted to an angle suited to a viewpoint position of a driver seated in the driver's seat,
the passenger is a passenger seated in the front passenger seat of the vehicle, and
when it is predicted that the passenger will leave the vehicle, the controller adjusts the orientation of the display system on the side of the front passenger seat to angle suited to a viewpoint position of the passenger seated in the front passenger seat.

4. The display system according to claim 1, wherein when a sensing signal indicating that a seat belt worn by the passenger is detached, the controller predicts that the passenger will leave the vehicle.

5. The display system according to claim 1, wherein the controller analyzes the video captured by the camera, and
determines whether there is an object approaching the vehicle from behind based on a result of analysis of the video and does not switch the mode of the display system in the absence of an object approaching the vehicle from behind even if it is predicted that the passenger will leave the vehicle.

6. The display system according to claim 1, wherein the passenger is a passenger seated in a rear seat of the vehicle,
the display is a display for the rear seat, and when it is predicted that the passenger will leave the vehicle, the controller causes the display for the rear seat to display the video captured by the camera.

7. A display system comprising:
a display provided in a vehicle to display a video captured by a camera provided in the vehicle to capture a scene around the vehicle;
a controller that switches, when it is predicted that a passenger of the vehicle will leave the vehicle, a mode of the display system to a first mode, in which a distance of sight from the passenger to the display is reduced;
a plurality of reflecting surfaces in a housing; and
a reflecting mirror transmitting a portion of incident light and reflecting a portion of incident light and mounted in an opening of the housing, wherein
the display is in the housing,
light emitted from the display is reflected by the plurality of reflecting surfaces and is output outside the housing,
the plurality of reflecting surfaces include a reflecting surface of the reflecting mirror, and
when it is predicted that the passenger will leave the vehicle, the controller switches to the first mode by causing the display to rotate in the housing so that a display surface of the display faces the reflecting mirror.

8. The display system according to claim 7, wherein the display is lifted up and rotated in the housing so that the display surface of the display faces the reflecting mirror.

\* \* \* \* \*